March 20, 1945.
C. DORSMAN
2,372,062
DEVICE FOR MEASURING LOW DIRECT VOLTAGES
Filed Dec. 24, 1942
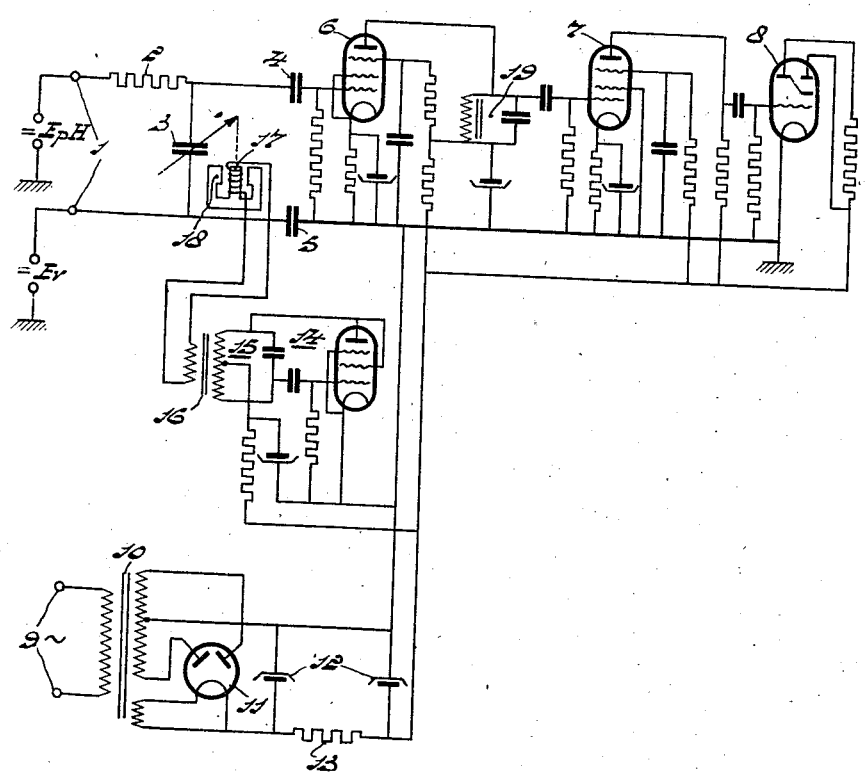
INVENTOR
Cornelis Dorsman
By E. F. Wenderoth
ATTORNEY Patented Mar. 20, 1945

2,372,062

UNITED STATES PATENT OFFICE 2,372,062

DEVICE FOR MEASURING LOW DIRECT VOLTAGES

Cornelis Dorsman, Eindhoven, Netherlands; vested in the Alien Property Custodian Application December 24, 1942, Serial No. 470,099
In the Netherlands January 6, 1941

4 Claims. (Cl. 171—95)

For measuring direct-current voltages of slight value and, more particularly, for measuring the terminal voltage of a source of direct current of very high internal resistance there are known devices with which the direct-current voltage to be measured is converted into an alternating voltage by means of a condenser which is charged by the direct-current voltage to be measured whilst means are provided with the aid of which the condenser capacity is periodically altered with a determined frequency. From the condenser may be taken in this case an alternating voltage whose amplitude is proportional to the value of the direct-current voltage supplied thereto and which, after being amplified and, as the case may be, after being rectified, can be measured in a simple manner. Such devices may also be advantageously utilized in determining the value of direct-current voltages with the aid of a compensation method, in which event the accuracy attained depends on the accuracy with which the difference in value between the unknown direct-current voltage and the known direct-current voltage can be measured.

The applicant has found that the accuracy with which a direct-current voltage can be measured with the aid of the above-described devices is under certain conditions considerably smaller than might be expected in view of the amplifier utilized for the amplification of the alternating voltage taken from the condenser.

The invention has for its object to provide means which ensure, with devices of the above-described type, a considerably greater accuracy of measurement.

The invention is based on the recognition that the accuracy of measurement may be harmfully influenced by the source of supply of the amplifier employed if this source of supply furnishes a supply voltage which contains at least an alternating voltage component and that the said harmful influence occurs even when the supply voltages obtained by rectification and supplied to the amplifying tubes of the amplifier (anode- and screen grid voltages, control grid bias voltages and the like) are carefully smoothed.

According to the invention, the said drawback, which is apparently due to capacitative and/or inductive coupling between, on the one hand, the conductors of the supply lines present in the space in which the measuring device is arranged and, on the other hand, the condenser of periodically varying capacity, its connecting conductors to the amplifier and to the source which furnishes the direct-current voltage to be measured and conductors or objects connected to the said source, is avoided by ensuring that the variation frequency of the condenser differs from the frequency of the said alternating voltage component and of those higher harmonics of this frequency which may give rise to a disturbing alternating voltage component in the amplifier whilst the alternating voltages of different frequencies which are taken from the condenser are separated according to frequency in such manner that of these alternating voltages only those whose frequency corresponds to the variation frequency of the condenser, bring about an indication.

In order to simplify the separation according to frequency of the alternating voltages taken from the condenser, if the variation frequency of the latter is comparatively low, for example, less than 200 C. P. S. the variation frequency is preferably so chosen as to be, at least approximately, equal to $(a+\frac{1}{2})n$ where $n$ is the frequency of the alternating voltage component of the supply voltage and where $a$ is an integer.

The separation of the alternating voltages according to frequency may be effected by the indicating instrument itself which is connected to the amplifier by utilizing as such an indicating instrument which is only responsive to a determined frequency.

It is, however, advisable to utilize an amplifier which selectively amplifies the variation frequency of the condenser, owing to which it is rendered possible to employ a responsive indicating instrument of common type, for example, a moving coil instrument or a cathode-ray indicator.

The invention will be explained more fully with reference to the accompanying drawing which represents, by way of example, one favourable embodiment thereof.

With the device according to the figure the direct-current voltage to be measured consists of the difference between a voltage of unknown value $E_{pH}$, as is the case, for example, in determining concentrations of acid (measurements of pH) and an adjustable comparison voltage $E_v$ of known value. The difference of voltage prevailing across the connecting terminals I of the device according to the invention is supplied to the series connection of an ohmic resistance 2, preferably of high value, and a condenser 3, with the result that the condenser is charged by the voltage to be measured. By altering the value of the condenser periodically at a determined frequency, there is set up across the connecting terminals of the condenser an alternating voltage whose value is proportional to the value of the direct-current voltage supplied to the condenser. In the device shown the alternating voltage thus obtained is supplied, with the aid of coupling condensers 4, 5, to the control grid of an amplifying tube 6 and, after being further amplified with the aid of a second amplifying tube 7, is supplied to the control grid of a triode amplifying system which is contained, jointly with a cathode ray indicator, in a tube 8, the said indicator acting in the present instance as the indicating instrument. The circuit arrangement is so chosen that if no alternating voltages occur at the condenser 3 and if, consequently, $E_{PH}$ and $E_V$ are equal, the fluorescent surface of the cathode-ray indicator has a minimum and constant size whereas, if the said voltages have different values and if, consequently, there occurs at the condenser 3 an alternating voltage whose value is proportional to the difference voltage, the fluorescent surface is larger than in the first-mentioned case and, besides, varies in the rhythm of the alternating voltage.

The amplifier is energized from alternating current lines. The alternating voltage taken from the lines is supplied to the connecting terminals 9 of the primary winding of a transformer 10 and, after being rectified by a full-wave rectifying tube 11 the rectified current is smoothed with the aid of a smoothing filter consituted by two condensers 12 and a series-resistance 13, and supplied to the amplifying tubes 6, 7 and 8.

Since amplifying systems and supply systems of the type shown in the figure may be assumed to be known and since the precise construction thereof is not essential for the present invention, they will not be described here in detail.

As previously mentioned, the invention has for its object to prevent alternating voltages which originate from the power supply network and which, due to capacitative and/or inductive coupling between the power supply network and the condenser 3 with the conductors and devices connected thereto, produce similar alternating voltages across the connecting terminals of the condenser 3, from having a disturbing influence on the measurements to be taken.

The frequencies of the disturbing voltages which may occur due to the said coupling, correspond of course to the frequency and/or to higher harmonics of the alternating voltage supply lines; it should be considered in this connection that some higher harmonics of the frequency of the supply lines or, in the case of direct-current supply lines, higher harmonics of the fundamental frequency of the alternating voltage component of the supply lines voltage, frequently have a comparatively large amplitude. The disturbances thus produced would give rise to the impossibility of stating exactly when the alternating voltage set up by the voltage to be measured is equal to zero since, independently thereof, there always occurs at the condenser an alternating voltage. According to the invention, such a disturbing influence is avoided by choosing the variation frequency of the capacity of the condenser 3 in such manner that it differs from the frequency of the supply lines and from those higher harmonics thereof which might give rise to disturbances whilst those alternating voltages taken from the condenser which have a frequency which corresponds to the variation frequency of the condenser capacity are only supplied to the indicating instrument after being selectively amplified.

To that end the device shown comprises a tube generator 14 in a circuit arrangement which is known in itself. This generator is supplied by the power supply device provided for the amplifier and generates oscillations whose frequency is determined by an oscillatory circuit 15. The oscillations set up in this circuit are supplied, with the aid of a transformer 16, to a coil 17 which is movably arranged in a magnetic field produced by a permanent magnet 18. The coil 17 and the magnet 18 may consist of an arrangement similar to that used for loud speakers. As is diagrammatically indicated in the figure, the coil 17 is mechanically connected to one of the electrodes of the condenser 3 in such manner that the electrodes are set into relative vibration and thus the capacity of the condenser is altered in the rythm of the oscillations produced by the generator 14. A direct-current voltage supplied to the condenser 3 is converted in this case into an alternating voltage whose frequency corresponds to the natural frequency of the circuit 15. This alternating voltage is selectively amplified with the aid of the amplifier 6, 7, 8. The anode impedance of the tube 6 consists of an oscillatory circuit 19 tuned to the variation frequency of the condenser 3. At a proper choice of the variation frequency it will in general be possible to obtain a sufficient selection even with the aid of a single oscillatory circuit of satisfactory quality. In view thereof the variation frequency is preferably so chosen as to correspond to $(a+\frac{1}{2})n$ where $n$ is the frequency of the supply lines or, in the case of direct-current supply lines, the fundamental frequency of the alternating voltage component of the voltage of the supply lines and where $a$ is an integer preferably larger than unity. If, for example, $n=50$ C. P. S. the variation frequency preferably amounts for example, to 125 C. P. S.

Owing to the said steps it is ensured that any disturbing voltages occurring at the condenser 3 and originating from the supply lines have no influence on the indicating instrument and that thus a very high degree of accuracy is guaranteed

What I claim is:

1. In combination, an electrically operated device for measuring a direct-current voltage of small value and a power supply for said device containing circuit elements carrying an alternating current, said measuring device comprising a variable condenser, means to connect the condenser to the direct-current voltage to be measured, an amplifier energized by said power supply and connected to said condenser, an indicating element energized by said amplifier, means to periodically vary the capacitance of said condenser at a frequency different from the frequency of the said alternating current and from the frequency of harmonics of the alternating current capable of producing disturbing voltages in the amplifier, and means to preferentially suppress the transmission of said disturbing voltages through the amplifier while permitting passage of the voltage derived from said condenser.

2. In combination, an electrically operated device for measuring a direct-current voltage of small value and a power supply for said device containing circuit elements carrying an alternating current, said measuring device comprising a variable condenser, means to connect the condenser to the direct-current voltage to be measured, an amplifier energized by said power supply and connected to said condenser, an indicating element energized by said amplifier, means to periodically vary the capacitance of said condenser at a frequency approximating the value $(a+\frac{1}{2})n$ where $n$ is the frequency of the said alternating current and $a$ is an integer, and means to preferentially suppress disturbing voltages induced in said amplifier while permitting transmission therethrough of the voltage derived from said condenser.

3. In combination, an electrically operated device for measuring a direct-current voltage of small value and a power supply for said device containing circuit elements carrying an alternating current, said measuring device comprising a variable condenser, means to connect the condenser to the direct-current voltage to be measured, an amplifier energized by said power supply and connected to said condenser, an indicating element energized by said amplifier, and means to periodically vary the capacitance of said condenser at a frequency different from the frequency of the said alternating current and from the frequency of harmonics of the frequency of the alternating current capable of producing disturbing voltage in the amplifier, said amplifier selectively amplifying voltage having the frequency of variation of the condenser.

4. In combination, an electrically operated device for measuring a direct-current voltage of small value and a power supply for said device containing circuit elements carrying an alternating current, said measuring device comprising a variable condenser, means to connect the condenser to the direct-current voltage to be measured, an amplifier energized by said power supply and connected to said condenser, an indicating element energized by said amplifier, means to periodically vary the capacitance of said condenser at a frequency different from the frequency of the said alternating current and from the frequency of harmonics of the frequency of the alternating current capable of producing disturbing voltages in the amplifier, said latter means comprising an alternating current generator energized by said power supply and a movable coil electrically connected to said generator, arranged in a permanent magnet field and mechanically coupled to said condenser, and means to preferentially suppress the transmission of said disturbing voltages through the amplifier while permitting passage of the voltage derived from said condenser.

CORNELIS DORSMAN.